(12) United States Patent
Tsirkin et al.

(10) Patent No.: US 9,983,893 B2
(45) Date of Patent: *May 29, 2018

(54) HANDLING MEMORY-MAPPED INPUT-OUTPUT (MMIO) BASED INSTRUCTIONS USING FAST ACCESS ADDRESSES

(71) Applicant: Red Hat Israel, Ltd., Raanana (IL)

(72) Inventors: Michael Tsirkin, Yokneam (IL); Gleb Natapov, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 549 days.

This patent is subject to a terminal disclaimer.

(21) Appl. No.: 14/043,132

(22) Filed: Oct. 1, 2013

(65) Prior Publication Data

US 2015/0095548 A1   Apr. 2, 2015

(51) Int. Cl.
*G06F 9/00*   (2006.01)
*G06F 9/455*   (2018.01)

(52) U.S. Cl.
CPC ...... *G06F 9/45545* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | |
|---|---|---|
| 5,812,826 A | 9/1998 | McLain, Jr. |
| 5,953,520 A | 9/1999 | Mallick |
| 6,622,263 B1* | 9/2003 | Stiffler .............. G06F 11/1469 711/135 |
| 6,854,071 B2* | 2/2005 | King .................. G06F 11/0727 369/53.35 |
| 6,886,111 B1* | 4/2005 | Tran .................. G06F 11/3696 714/38.13 |
| 8,099,730 B2 | 1/2012 | Wang et al. |

(Continued)

OTHER PUBLICATIONS

Tsirkin et al., Re: [Patch RFC] kvm: add PV MMIO Eventfd, Linux Virtualization, www.spinics.net, Apr. 4, 2013, retrieved on Apr. 22, 2015, 2 pages, Internet: <http://www.spinics.net/lists/linux-virtualization/msg19785.html>.

(Continued)

*Primary Examiner* — David X Yi
*Assistant Examiner* — Craig Goldschmidt
(74) *Attorney, Agent, or Firm* — Lowenstein Sandler LLP

(57) ABSTRACT

When a guest of a virtual machine attempts to accesses an address that causes an exit from the guest to the hypervisor of a host, the hypervisor receives an indication of an exit by a guest to the hypervisor. The received address is associated with a memory-mapped input-output (MMIO) instruction. The hypervisor determines, based on the received indication, that the exit is associated with the memory-mapped input-output (MMIO) instruction. The hypervisor identifies the address that caused the exit as a fast access address. The hypervisor identifies one or more memory locations associated with the fast access address, where the one or more memory locations store information associated with the MMIO instruction. The hypervisor identifies the MMIO instruction based on the stored information. The hypervisor executes the MMIO instruction on behalf of the guest.

20 Claims, 6 Drawing Sheets

(56) References Cited

U.S. PATENT DOCUMENTS

| | | | |
|---|---|---|---|
| 8,161,243 B1 | 4/2012 | Wagh et al. | |
| 8,239,610 B2 | 8/2012 | Van Riel et al. | |
| 8,392,628 B2 | 3/2013 | Santos et al. | |
| 8,819,676 B2 | 8/2014 | Ports et al. | |
| 8,838,914 B2 | 9/2014 | Adams et al. | |
| 8,954,959 B2 | 2/2015 | Tsirkin et al. | |
| 9,122,594 B2 | 9/2015 | Mahalingam et al. | |
| 2002/0129226 A1* | 9/2002 | Eisen | G06F 9/3806 712/228 |
| 2003/0046505 A1 | 3/2003 | Craddock | |
| 2003/0093781 A1* | 5/2003 | Krishna | G06F 9/44521 717/162 |
| 2003/0212883 A1 | 11/2003 | Lee | |
| 2005/0091383 A1 | 4/2005 | Bender et al. | |
| 2005/0204357 A1 | 9/2005 | Garg | |
| 2006/0010440 A1 | 1/2006 | Anderson | |
| 2006/0259292 A1 | 11/2006 | Solomon et al. | |
| 2008/0005447 A1 | 1/2008 | Schoenberg et al. | |
| 2008/0215770 A1 | 9/2008 | Liu | |
| 2008/0307180 A1 | 12/2008 | Hattori | |
| 2009/0037936 A1* | 2/2009 | Serebrin | G06F 12/0292 719/318 |
| 2009/0144731 A1 | 6/2009 | Brown | |
| 2009/0276775 A1 | 11/2009 | Brown | |
| 2009/0300263 A1 | 12/2009 | Devine | |
| 2010/0037096 A1 | 2/2010 | Bum | |
| 2010/0138616 A1 | 6/2010 | Banga et al. | |
| 2010/0162243 A1 | 6/2010 | Barde | |
| 2010/0250824 A1 | 9/2010 | Belay | |
| 2011/0153909 A1 | 6/2011 | Dong | |
| 2011/0179418 A1 | 7/2011 | Takebe | |
| 2011/0296411 A1 | 12/2011 | Tang et al. | |
| 2012/0033673 A1 | 2/2012 | Goel | |
| 2012/0072619 A1 | 3/2012 | Tsirkin et al. | |
| 2012/0084487 A1 | 4/2012 | Barde | |
| 2012/0137292 A1 | 5/2012 | Iwamatsu et al. | |
| 2012/0159039 A1 | 6/2012 | Kegel et al. | |
| 2012/0167082 A1 | 6/2012 | Kumar | |
| 2014/0068137 A1 | 3/2014 | Kegel et al. | |
| 2014/0173338 A1 | 6/2014 | Arroyo | |
| 2014/0173628 A1 | 6/2014 | Ramakrishnan | |
| 2014/0379956 A1 | 12/2014 | Chang | |
| 2015/0026379 A1 | 1/2015 | Yang et al. | |
| 2015/0095548 A1 | 4/2015 | Tsirkin | |
| 2015/0127969 A1 | 5/2015 | Arroyo et al. | |
| 2015/0149997 A1* | 5/2015 | Tsirkin | G06F 9/45558 718/1 |
| 2015/0199283 A1 | 7/2015 | Epstein | |
| 2016/0062810 A1 | 3/2016 | Von Wendorff | |

OTHER PUBLICATIONS

Willmann et al., "Protection Strategies for Direct Access to Virtualized I/O Devices" USENIX Annual Technical Conference 2008, pp. 15-28, USENIX Association.
KVM: MMU: Fast Page Fault, https://lwn.net/Articles/489307/, Mar. 29, 2012, Xiao Guangrong, 3 pages.
"Patch] KVM: MMU: Avoid Fast Page Fault Fixing Mmio Page Fault, https://lkml.org/lkml/2013/7/18/6, Xiao3uangrong, Jul. 18, 2013, 1 page".
USPTO, Notice of Allowance for U.S. Appl. No. 15/018,043, dated May 3, 2017.
USPTO, Notice of Allowance for U.S. Appl. No. 15/018,043, dated Aug. 10, 2017.
USPTO, Office Action for U.S. Appl. No. 14/089,105, dated Jan. 7, 2016.
USPTO, Final Office Action for U.S. Appl. No. 14/089,105, dated Jun. 27, 2016.
USPTO, Notice of Allowance for U.S. Appl. No. 14/089,105, dated Jul. 26, 2017.

* cited by examiner

FAST ACCESS ADDRESS LIST 128

| Fast Access MMIO Address 305a | General Purpose Register 160a |
|---|---|
| Fast Access MMIO Address 305b | General Purpose Register 160b |
| . . | . . |
| Fast Access MMIO Address 305n | General Purpose Register 160n |

FIGURE 3

HANDLING MEMORY-MAPPED INPUT-OUTPUT (MMIO) BASED INSTRUCTIONS USING FAST ACCESS ADDRESSES

TECHNICAL FIELD

Embodiments of the present disclosure relate to a computer system, and more specifically, to permitting a hypervisor to execute a low-overhead memory-mapped input output (MMIO) instruction by a guest.

BACKGROUND

A central processing unit (CPU) may access a peripheral device, such as a printer or video card using memory mapped input-output (MMIO). MMIO employs the same address bus to address both physical memory and I/O devices (e.g., physical peripheral devices)—the memory and registers of I/O devices are mapped to (associated with) memory address values, respectively. When an address is accessed by the I/O device, the accessed address may refer to a portion of physical RAM or to memory of an I/O device in an address space of the I/O device. CPU instructions employed to access the physical memory may be used for accessing peripheral devices. Each I/O device monitors the address bus of the CPU and responds to any CPU access of an address assigned to the I/O device, connecting the data bus associated with the CPU to the hardware register of the I/O device. To accommodate I/O devices, blocks of addresses used by the host I/O device may be reserved for I/O and are not be available for CPU physical memory.

Virtualization permits multiplexing of an underlying host machine (associated with a physical CPU) between different virtual machines. The host machine or "host" allocates a certain amount of its resources to each of the virtual machines. Each virtual machine may then use the allocated resources to execute applications, including operating systems (referred to as guest operating systems (OS) of a "guest"). The software layer providing the virtualization is commonly referred to as a hypervisor and is also known as a virtual machine monitor (VMM), a kernel-based hypervisor, or a host operating system of the host.

A virtual machine may access a virtual device using guest addresses. The hypervisor may expose a virtual device to the guest to permit the guest to execute instructions on the virtual device. If a virtual device is a virtual peripheral device, such as a virtual printer or virtual video card, the virtual device may be accessed using memory mapped input-output (MMIO).

When a guest address is accessed by the guest, the accessed guest address may refer to a portion of guest RAM or to guest memory of a virtual I/O device. Guest CPU instructions used to access the guest memory may be used for accessing virtual I/O devices. To accommodate virtual I/O devices, blocks of guest addresses used by the virtual devices may be reserved for I/O and are not be available for guest physical memory.

During execution of an MMIO-based instruction of the guest, the guest may attempt to access a guest address mapped to a memory space of the virtual device. The associated CPU typically translates the guest address to a hypervisor address by "walking" through page table entries of a guest page table located in the guest. In the guest page table, entries for guest addresses mapped to a memory space of the virtual device are typically marked as invalid to prevent the guest from directly accessing such addresses and trigger an exit to the hypervisor. On exit to the hypervisor, the hypervisor is usually provided by the CPU with only the guest address that the guest attempted to access. In order for the hypervisor to identify the associated MMIO instruction(s) and associated parameter(s) (e.g., one or more operands), the hypervisor typically re-executes the page walk and performs relatively computationally expensive instruction retrieval and instruction decoding operations.

BRIEF DESCRIPTION OF THE DRAWINGS

FIG. 3 is a block diagram that illustrates one example of a configuration of a fast access address list.

DETAILED DESCRIPTION

Methods and systems for permitting a hypervisor to execute a low-overhead MMIO instruction on behalf of a guest are disclosed. A hypervisor of a host machine ("host") informs a guest of the presence of the hypervisor. The hypervisor requests the guest to provide a list of fast access addresses for permitting the hypervisor to obtain information related to attempts by the guest to access addresses related to memory-mapped input-output (MMIO) instructions. A fast access address is an address associated in the hypervisor (and, in some examples, the guest) with an additional set of memory locations. The hypervisor receives the list of fast access addresses. Alternatively, the hypervisor can designate one or more addresses as fast access addresses and provide the list to the guest.

When the guest attempts to accesses an address that causes an exit from the guest to the hypervisor, the hypervisor receives the address that has caused the exit. The hypervisor determines that the received address is a fast access address and identifies an additional set of memory locations associated with the received address.

The additional set of memory locations may correspond to one or more general purpose registers. The one or more general purpose registers may store an indication of a type of MMIO instruction to execute. The one or more general purpose registers may further store additional information about the MMIO instruction. The additional information may comprise an MMIO address associated with an MMIO-based device or one or more parameters associated with the MMIO instruction.

The hypervisor executes the instruction on behalf of the guest. The instruction may be a memory-mapped input-output (MMIO)-based instruction performed on a virtual device or a physical device.

Accordingly, an efficient method and system is provided that enables a guest to execute an MMIO instruction with low overhead. The method described herein improves processing time by avoiding the overhead associated with computationally expensive instruction retrieval and instruction decoding operations to obtain hypervisor data needed for execution of the MMIO instruction. The hypervisor does not need to access the guest memory to extract information about the intended MMIO instruction and does not need to analyze information in the page table. Additionally, more parameters can be passed to the hypervisor for executing an MMIO instruction on behalf of the guest than would normally be possible when execution passes to the hypervisor from the guest.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
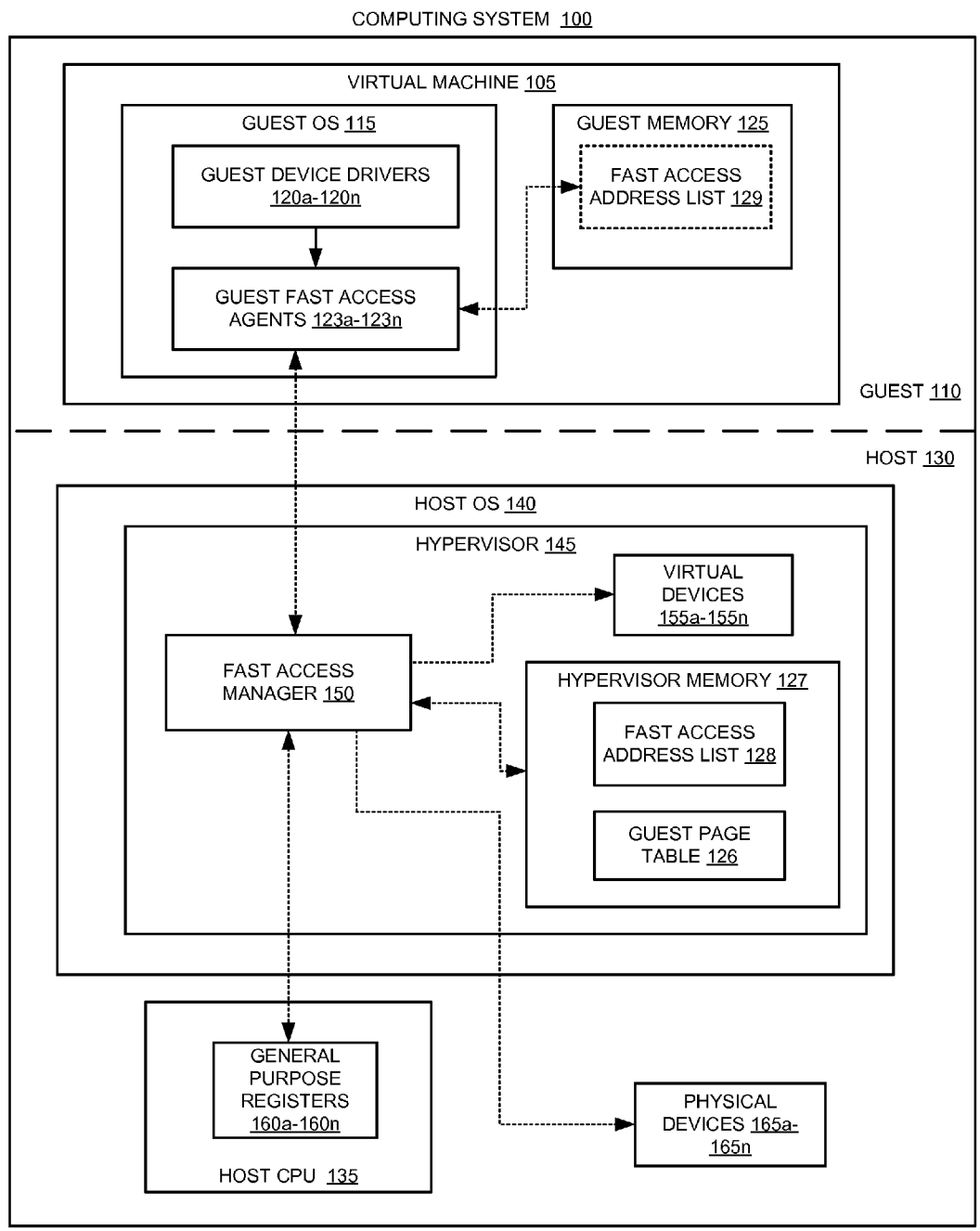
FIG. 1 is a block diagram that illustrates an example computing system in which examples of the present disclosure may operate.

FIG. 1 is a block diagram that illustrates an example computing system 100 in which examples of the present disclosure may operate. The computing system 100 hosts a virtual machine (VM) 105. The virtual machine 105 runs a guest (e.g., guest 110) that uses a guest operating system 115 to manage its resources. The virtual machine 105 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a host system that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest 110, etc.

In one example, the computing system 100 runs a hypervisor 145 to virtualize or expose access to underlying host hardware (e.g., the physical devices 165a-165n) of a host 130, making the use of the virtual machine 105 transparent to the guest 110 and the users of the computing system 100. In one example, the hypervisor 145 may support the virtual machine 105. In one example, the hypervisor 145 is part of a host operating system (OS) 140 of the host 130.

In an example, the computing system 100 also includes hardware components (host hardware) including a host central processing unit (CPU) 135. The computing system 100 may also include host memory (not shown) and physical devices 165a-165n. In a virtualized environment, a virtual machine 105 may not have direct access to the physical devices 165a-165n.

Access to or emulation of a physical device (e.g., 165a) may be indirectly handled by the intervening hypervisor 145. The guest 110 may be configured to load device-specific modules (guest device drivers) 120a-120n associated with one or more virtual devices 155a-155n. The hypervisor 145 is configured to emulate (e.g., provide the guest 115 with access to) the one or more virtual devices 155a-155n in cooperation with the guest device drivers 120a-120n residing on the virtual machine 105.

When the guest 110 attempts to access a virtual device (e.g., 155a) using an MMIO-based instruction, the guest 110 may attempt to access a guest address mapped to a memory space of the virtual device (e.g., 155a). The host CPU 135 translates the guest address to a hypervisor address by "walking" through page table entries of a guest page table 126 located in the hypervisor memory 127. In the guest page table 126, entries for guest addresses mapped to a memory space of the virtual device can be marked as invalid to trigger an exit to the hypervisor 145. If the page table entry corresponding to the provided address is marked as invalid, it indicates to the host CPU 135 that the provided address that has caused an exit from the guest 110 to the hypervisor 145 was likely the result of the guest's attempt to execute a MMIO-based instruction. In addition or alternatively, when the guest 110 attempts to access a virtual device using an MIMO-based instruction, the guest 110 may use a system call designated for MIMO-based instructions, which indicates to the host CPU 135 that an exit from the guest 110 to the hypervisor 145 was the result of the guest's attempt to execute a MMIO-based instruction. On exit to the hypervisor 145, the hypervisor 145 is provided by the host CPU 135 with the guest address that the guest 110 attempted to access and an exit-type indication from the host CPU 135 that the provided address that has caused an exit from the guest 110 to the hypervisor 145 was the result of the guest's attempt to execute a MMIO-based instruction.

In addition to the above guest address and exit-type indication, the hypervisor 145 should also know the MMIO instruction associated with the guest address that caused an exit, and input/output parameter(s) (e.g., one or more operands) of the associated MMIO instruction. To this effect, in one example, one or more of the guest device drivers 120a-120n may be hard-coded to execute a specific MMIO operation of a specific type.

For example, one device driver (e.g., 120a) may be configured to transmit packets to an external network (not shown, e.g., the Internet). Another device driver (e.g., 120b, 120n) may be responsible for writing data or reading data, respectively, outside of the virtual machine 105. Each of the guest device drivers 120a-120n may be further provided with corresponding guest fast access agents 123a-123n. A fast access agent (e.g., 123a) may be configured to interact with a corresponding device driver (e.g., 120a) to carry out a specific MMIO operation by interacting with the hypervisor 145. Each fast access agent (e.g., 123a) may be configured (e.g., hard-coded) to "know": (a) what MMIO address(es) to employ as fast access address(es) for a specific MMIO instruction (e.g., send a packet, store data, etc.), and (b) which general purpose registers GPR(s) 160a-160n may be accessed to determine and to manipulate information stored in the GPR(s) 160a-160n needed to execute a specific MMIO instruction. This information may comprise an indication of a type of instruction to execute, an address to operate on in an MMIO-based device, and other parameters (e.g., one or more operands).

In one example, (a) and (b) may be hard-coded in the guest device driver (e.g., 120a) or may be received from hypervisor 145. The guest device drivers 120a-120n and the guest fast access agents 123a-123n may be installed and initiated together with the hypervisor 145.

Figure 2:
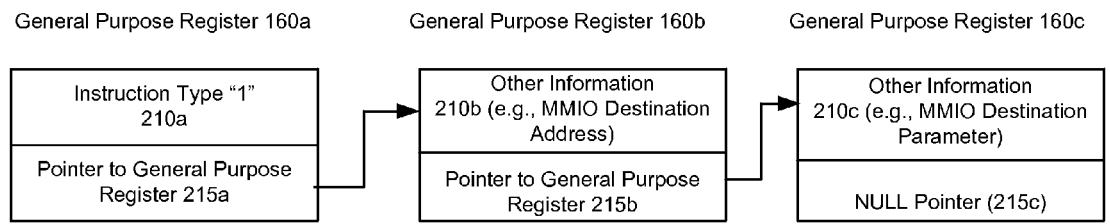
FIG. 2 is a block diagram that illustrates one example of a configuration of general purpose registers.

FIG. 2 is a block diagram that illustrates one example of a configuration of general purpose registers 160a-160n. A general purpose register (e.g., 160a) may be configured to store an indication (e.g., 210a) of a type of MMIO instruction to execute (e.g., instruction type "1"). For example, a code or identifier for transmitting packets may be assigned an instruction type of "1". The general purpose register 160a may be further configured to store an identifier or pointer to additional information (e.g., 215a) needed to execute MMIO instruction type "1". The pointer to additional information (e.g., 215a) may comprises an identifier (e.g., an MMIO address or pointer) to a second general purpose register (e.g., 160b) that may be employed, for example, to provide other information 210b (e.g., the destination address or original address of where the packet to be transmitted is stored). The general purpose register 160b may be further configured to store an identifier or pointer (e.g., 215b) to another general purpose register (e.g., 160c) that stores additional information (e.g., 210c) needed to execute the MMIO instruction type "1". The additional information (e.g., 210c) may comprise, for example, a parameter associated with the MMIO instruction (e.g., a destination parameter). If additional parameters are needed, these may be stored in additional GPRs 160d-160n. If there are no more parameters, then the last pointer field of the last GPR (e.g., field 215c) may be set to a null indicator or pointer.

In the example above, each of the general purpose registers 160a-160n stores a limited amount of information because general purpose registers associated with the host 130 for many CPU architectures are of limited size, hence the need for additional GPRs (e.g., 160b-160n). In an example, the general purpose registers 160a-160n may be known to both the hypervisor 145 and the guest 110.

In another example, the guest device drivers 120a-120n and the guest fast access agents 123a-123n may not be hard-coded to "know" a priori which addresses are MMIO fast access addresses and which general purpose registers may be employed to store the information needed to execute an MMIO instruction. To this effect, the guest fast access agents 123a-123n may be provided by the guest 110 with a fast access address list 129 located in the guest memory 125.

The hypervisor may be configured to interact with the guest fast access agents 123a-123n to carry out MMIO instructions based on (a) and (b). The hypervisor 145 may be configured to store (a) and (b) for each of the guest device drivers 120a-120n in hypervisor memory 127 as a hypervisor list of fast access addresses 128, with each address being associated with a respective GPR 160a-160n, in order to execute MMIO instructions on behalf of the guest 110. To this effect, the hypervisor 145 may include a fast access manager 150 that assists the hypervisor 145 in determining the above information in an efficient manner. In particular, the fast access manager 150 can store a list of one or more fast access addresses 128 that the guest 110 may later use for reading data from or writing data to one or more virtual devices 155a-155n using MMIO-based instructions.

FIG. 3 is a block diagram that illustrates one example of a configuration of the fast access address list 128. The fast access address list 128 may store fast access MMIO addresses 305a-305n. The fast access address list 128 may further store a corresponding set of general purpose registers 160a-160n that the fast access manager 150 may access to reference MMIO-based instructions (e.g., a read instruction or a write instruction) and associated parameters (e.g., an address to read or write a second parameter) as described in FIG. 2.

At hypervisor initialization, the fast access manager 150 may be instantiated. During initialization of the fast access manager 150, the fast access manager 150 may be configured to make its presence known to the guest 110. The fast access manager 150 may be configured to request the guest 110 (e.g., the guest fast access agents 123a-123n) to provide one or more fast access addresses (e.g., 305a-305n). The fast access manager 150 may be configured to receive the one or more fast access addresses 305a-305n from the guest fast access agents 123a-123n that were either hard-coded into the guest device drivers 120a-120n or retrieved by the guest MMIO fast access agents 123a-123n from the optional fast access address list 129 located in the guest memory 125. In an example, the fast access manager 150 may be configured to receive from the fast access agents 123a-123n, one or more identifiers of general purpose registers 160a-160n to store types of instructions and parameters associated with the one or more fast access addresses 305a-305n. The fast access manager 150 may be configured to store the one or more fast access addresses 305a-305n and identifiers that identify general purpose registers 160a-160n that the fast access manager 150 may access in the fast access address list 128 located in the hypervisor memory 127.

The guest 110 may be configured to store a list of fast access addresses 128 in guest memory 129.

In another example, during hypervisor initialization, the fast access manager 150 may be instantiated. During initialization of the fast access manager 150, the fast access manager 150 may be configured to make its presence known to the guest 110. The fast access manager 150 may be configured to provide the fast access agents 123a-123n with one or more fast access addresses 305a-305n. The guest 110 may be configured to store the one or more fast access addresses 305a-305n in a list of fast access addresses 129 located in the guest memory 125 for later use by the fast access agents 123a-123n.

In an example, before the guest 110 executes an MMIO-based instruction (e.g., "write a value to an address of a virtual device" (e.g., 155a)), the guest 110 may be configured to store information associated with the MMIO-based instruction (e.g., the instruction name, one or more instruction parameters, other information, etc.) in one or more fast access locations (e.g., the general purpose registers 160a-160n) referenced by a corresponding second set of fast access addresses 128 in the guest memory 129.

In one example, before a guest driver (e.g., 120a) begins execution of an MMIO instruction, the corresponding guest fast access agent (e.g., 123a) may be configured to store an identifier (e.g., "1" for sending a packet) of the MMIO instruction in a general purpose register (e.g., in instruction type field 210a of general purpose register 160a). The guest fast access agent (e.g., 123a) may also store (e.g., in field 215a of general purpose register 160a) an identifier (e.g., a pointer or address) of another general purpose register (e.g., in field 215b of general purpose register 160b) where the guest fast access agent (e.g., 123a) stores additional information about the MMIO instruction (e.g., the address of a packet to be transmitted). The guest driver (e.g. 120a) then attempts to execute the MMIO instruction.

In another example, both the guest fast access agent (e.g., 123a) of the guest 110 and the fast access manager 150 of the hypervisor 145 may include matching logic such that, for example, "if general purpose register 160a stores a '1,' an additional parameter/address may be stored in general purpose register 160b, 160c, etc." In practice, general purpose register 160a may comprise a group of registers, not necessarily one register.

When the guest 110 attempts to execute the MMIO-based instruction by accessing an MMIO-based address, the guest 110 exits to the hypervisor 145. The hypervisor 145 (e.g., the fast access manager 150) receives control from the host CPU 135 and is provided by the host CPU 135 with the address that caused the exit to the hypervisor 145 and an indication from the host CPU 135 that the provided address that has caused an exit from the guest 110 to the hypervisor 145 was the result of the guest's attempt to execute a MMIO-based instruction. Based on the received indication, the hypervisor 145 (e.g., the fast access manager 150) determines that the exit is associated with the memory-mapped input-output (MMIO) instruction.

The fast access manager 150 consults the list of fast access addresses 128 to determine whether the provided address that caused an exit from the guest 110 to the hypervisor 145 is a fast access address (e.g., 305a). If the provided address is found in the list of fast access addresses 128, the fast access manager 150 identifies the provided address as a fast access address (e.g., 305a). The fast access manager 150 is further configured to identify one or more memory locations associated with the fast access address (e.g., 305a). The one or more memory locations store information associated with the MMIO instruction. This information may include at least the MMIO instruction that is to be executed. The information may also include one or more addresses/parameters associated with the MMIO instruction (e.g., an MMIO destination address, an MMIO destination value, etc.).

The fast access address (e.g., 305a) in the fast access address list 128 may be associated with a first general purpose register (e.g., 160a) to consult. The fast access manager 150 then consults the associated first general purpose register (e.g., 160a) to retrieve the identifier (e.g., 210a, e.g. "1") of the MMIO operation to be executed. If the operation to be executed has additional parameters, then the pointer to other information field (e.g., 215a) of a second general purpose register (e.g., 160b) may contain a non-null identifier of the next general purpose register to consult. This process repeats until there is a null identifier in the pointer field (e.g., 215c) of a final general purpose register (e.g., 160c) that was consulted.

The fast access manager 150 may be configured to execute the identified instruction on behalf of the guest 110 using the identified instruction and one or more identified operands.

Figure 4:
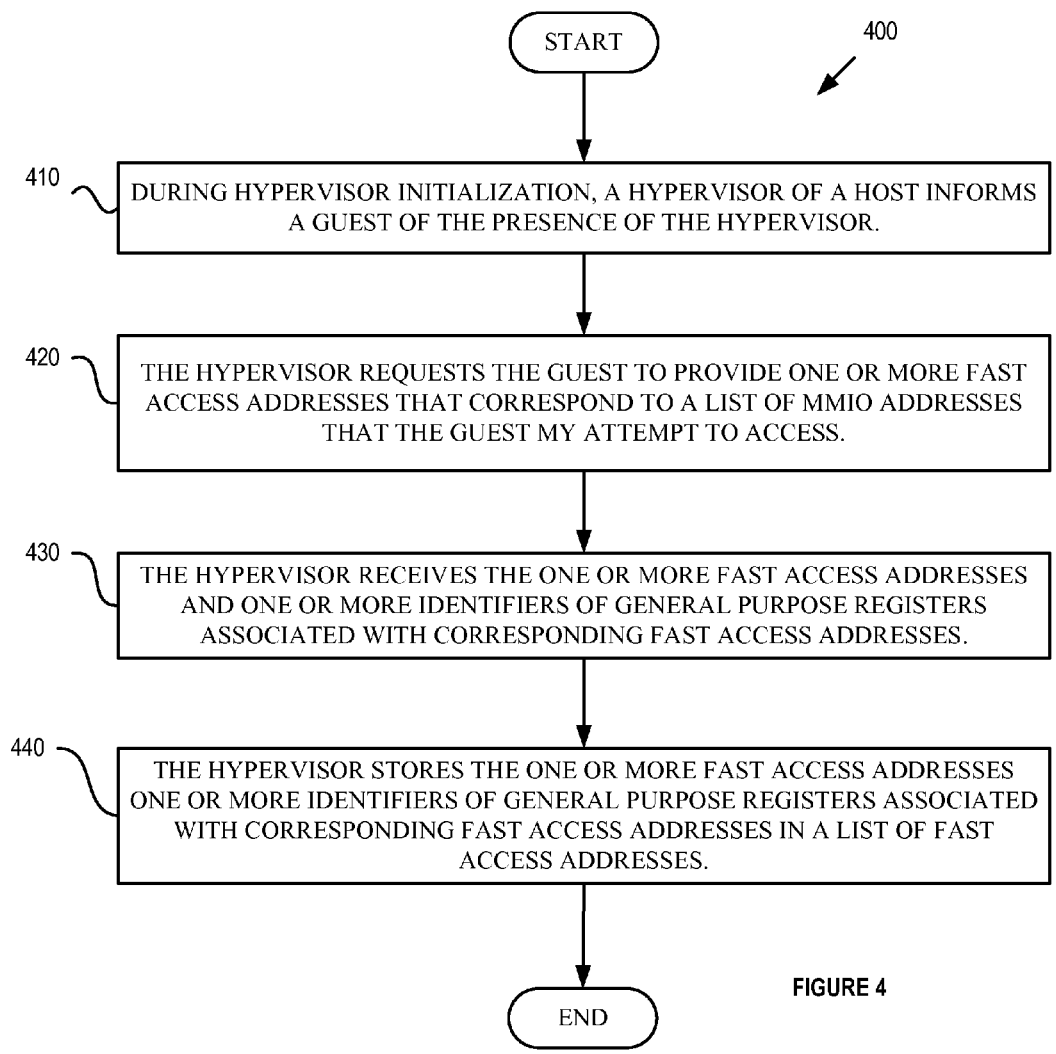
FIG. 4 is a flow diagram illustrating an example of a method for permitting a hypervisor to execute a low-overhead MMIO instruction on behalf of a guest.

FIG. 4 is a flow diagram illustrating an example of a method 400 for permitting the hypervisor 145 to execute a low-overhead MMIO instruction on behalf of a guest 110. The method 400 may be performed by a computer system 400 of FIG. 1 and may comprise hardware (e.g., circuitry, dedicated logic, programmable logic, microcode, etc.), software (e.g., instructions run on a processing device), or a combination thereof. In one example, the method 400 is performed by the fast access manager 150 of the hypervisor 145 of the host 130 of FIG. 1.

As shown in FIG. 4, to permit the hypervisor 145 to execute a low overhead MMIO instruction, at block 410, during hypervisor initialization—more specifically, during instantiation of the fast access manager 150 of the hypervisor 145—the fast access manager 150 informs the guest 110 of the presence of the hypervisor 145. At block 420, the fast access manager 150 requests the guest 110 to provide one or more fast access addresses (e.g., 305a-305n) that correspond to a list of MMIO addresses that the guest 110 may attempt to access when executing MMIO instructions.

At block 430, the fast access manager 145 receives the one or more fast access addresses (e.g., 305a-305n) from the guest 110. The guest 110 may be configured to store the one or more fast access addresses (e.g., 305a-305n) in a list of fast access addresses 129 in the guest memory 125. The fast access manager 150 may receive one or more identifiers of general purpose registers (e.g., 160a-160n) associated with corresponding fast access addresses (e.g., 305a-305n) that are needed to identify instructions associated with the fast access addresses (e.g., 305a-305n). At block 240, the fast access manager 150 stores the one or more fast access addresses (e.g., 305a-305n) and the corresponding one or more identifiers of general purpose registers (e.g., 160a-160n) in a list of fast access addresses 128 in the hypervisor memory 127 of the hypervisor 145.

In another example, the hypervisor 145—more specifically, the fast access manager 150—may provide the one or more fast access addresses (e.g., 305a-305n) and associated identities of general purpose registers (e.g., 160a-160n) to the guest 110. During hypervisor initialization, the fast access manager 150 may be instantiated. During initialization of the fast access manager 150, the fast access manager 150 may make its presence known to the guest 110. The fast access manager 150 may provide the fast access agents 123a-123n with one or more fast access addresses (e.g., 305a-305n). The guest 110 may store the one or more fast access addresses (e.g., 305a-305n) in a list of fast access addresses 129 located in the guest memory 125 for later use by the fast access agents 123a-123n.

Figure 5:
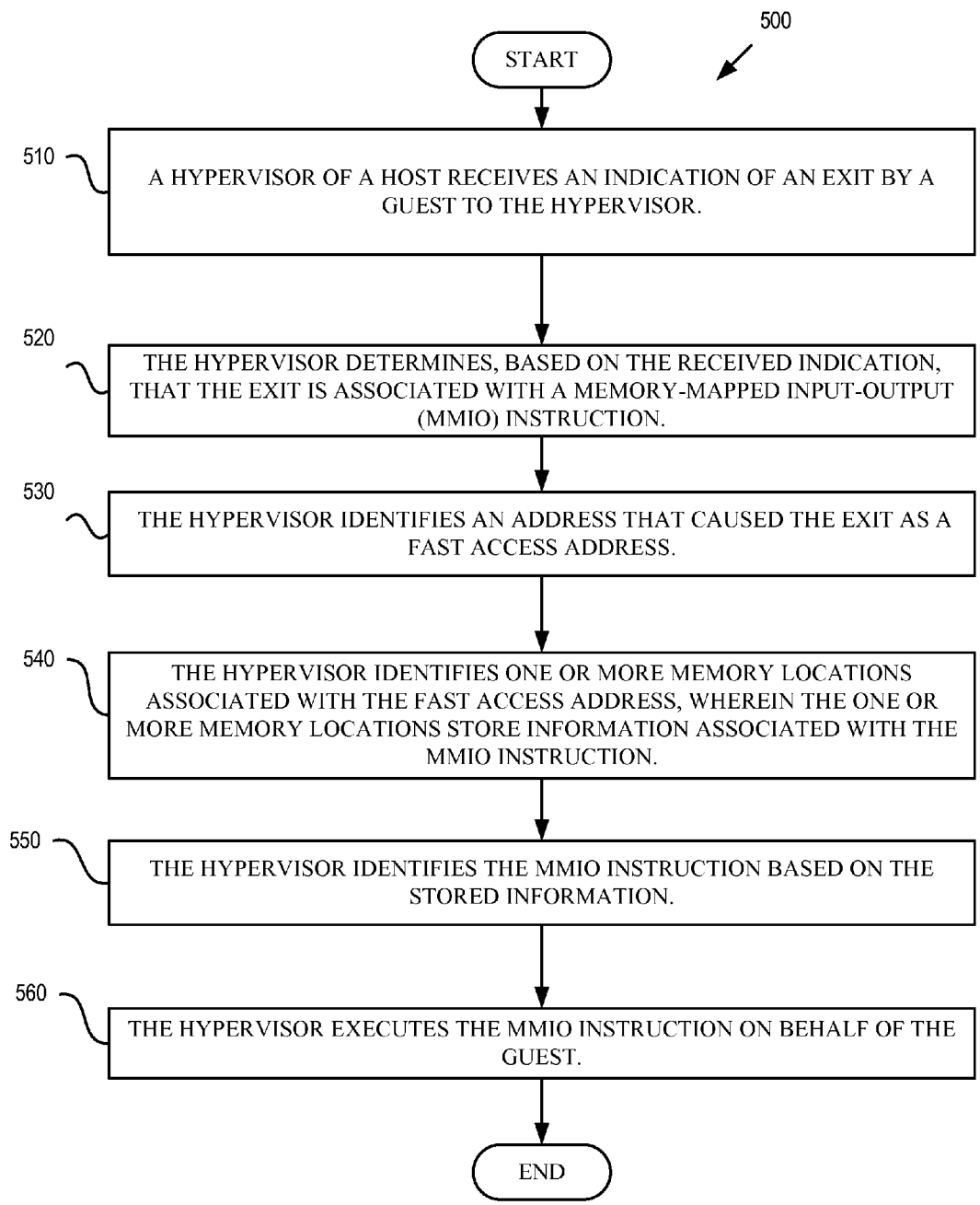
FIG. 5 is a flow diagram illustrating an example of a method for execution of a low-overhead MMIO instruction by the hypervisor on behalf of the guest.

FIG. 5 is a flow diagram illustrating an example of a method 500 for execution of a low-overhead MMIO instruction by the hypervisor 145 on behalf of the guest 110. The method 500 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 500 is performed by the fast access manager 150 of the hypervisor 145 of the host 130 of FIG. 1.

As shown in FIG. 5, at block 510, when the guest 110 accesses a guest address (e.g., 160a) corresponding to an instruction that causes an exit from the guest 110 to the hypervisor 145, the fast access manager 150 receives an indication of an exit of the guest 110 to the hypervisor 145 from the host 130. The received indication may comprise the guest address that causes an exit from the guest 110 to the hypervisor 145 and an indication that the type of exit to the hypervisor is associated with the execution of an MMIO instruction. At block 520, the fast access manager 150 determines, based on the received indication, that the exit was associated with an MMIO instruction. At block 530, the fast access manager 150 attempts to identify the address that caused the exit as a fast access address (e.g., 160a). The fast access manager 150 consults the list of fast access addresses 128 to determine whether the provided address that caused an exit from the guest 110 to the hypervisor 145 is a fast access address (e.g., 160a). If the provided address is found in the list of fast access addresses 128, the fast access manager 150 identifies the provided address as a fast access address (e.g., 160a).

At block 540, the fast access manager 150 identifies one or more memory locations associated with the fast access address. The one or more memory locations store information associated with the MMIO instruction. The one or more memory locations may correspond to one or more general purpose registers 160a-160n of the host 130. At block 550, the fast access manager 150 identifies the instruction that caused the exit based on information stored in the fast access address table 128. The information stored in the fast access address list 128 may include an entry of a general purpose register (e.g., 160a) that contains another identifier that identifies the MMIO instruction that is to be executed. The entry for the fast access address (e.g., 305a) in the fast access address list 128 may be associated with another entry (e.g., 310a) that indicates a general purpose register (e.g., 160a) to consult. The fast access manager 150 then consults the associated general purpose register (e.g., 160a) to retrieve the identifier (e.g., 210a, e.g. "1") of the MMIO operation to be executed. If the operation to be executed has additional parameters, then the pointer to other information field (e.g., 215a) may contain a non-null identifier of the next general purpose register to consult (e.g., 160b). This process repeats until there is a null identifier in the pointer field (e.g., 215c) of a final general purpose register (e.g., 160c) that was consulted.

At block 360, the fast access manager 150 executes the MMIO instruction on behalf of the guest 110 using the one or more identified operands.

Figure 6:
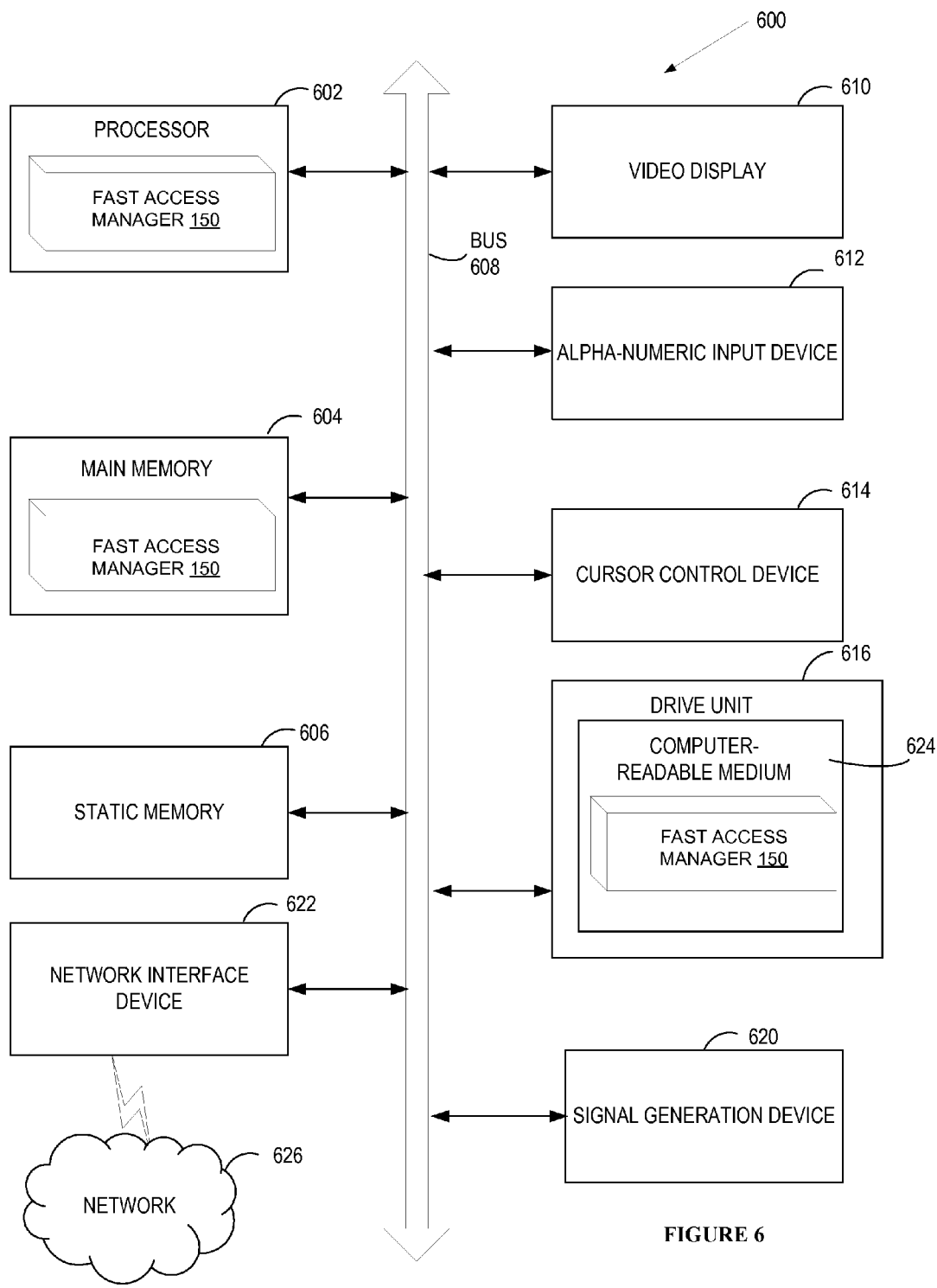
FIG. 6 illustrates a diagrammatic representation of a machine in the example form of a computer system within which a set of instructions, for causing the machine to perform any one or more of the methodologies discussed herein, may be executed.

FIG. 6 illustrates a diagrammatic representation of a machine in the example form of a computer system 600 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The fast access manager 150 shown in FIG. 1 may be executed by processor 602 configured to perform the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

A drive unit 616 may include a computer-readable medium 624 on which is stored one or more sets of instructions (e.g., instructions of the fast access manager 150) embodying any one or more of the methodologies or functions described herein. The instructions of the fast access manager 150 may also reside, completely or at least partially, within the main memory 604 and/or within the processor 602 during execution thereof by the computer system 600, the main memory 604 and the processor 602 also constituting computer-readable media. The instructions of the fast access manager 150 may further be transmitted or received over a network 626 via the network interface device 622.

While the computer-readable storage medium 624 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
receiving, by a processing device of a host executing a hypervisor, an indication of an exit by a guest to the hypervisor;
determining, by the hypervisor, in view of the received indication, that the exit is associated with a memory-mapped input-output (MMIO) instruction;
referencing, by the hypervisor, a fast access address list to determine that an address that caused the exit is a fast access address stored in the fast access address list, wherein the fast access address list is separate from a guest page table associated with the guest;
identifying, by the hypervisor, a first register corresponding to the fast access address in the fast access address list, the first register storing a type of the MMIO instruction;
identifying, via the first register, a second register storing information associated with the MMIO instruction;
identifying, by the hypervisor, the MMIO instruction in view of the stored type of the MMIO instruction and the information associated with the MMIO instruction; and
executing, by the hypervisor, the MMIO instruction on behalf of the guest.

2. The method of claim 1, wherein the fast access address list is stored in guest memory.

3. The method of claim 1, wherein the fast access address list is stored in hypervisor memory.

4. The method of claim 1, wherein the first register and the second register are one or more general purpose registers.

5. The method of claim 1, wherein the information comprises at least one of an MMIO address associated with an MMIO-based device or one or more parameters associated with the MMIO instruction.

6. The method of claim 4, wherein the first register and the second register are associated with the host.

7. The method of claim 4, wherein the first register and the second register are known to both the hypervisor and the guest.

8. The method of claim 1, further comprising, during hypervisor initialization:
notifying the guest, by the hypervisor, of a presence of the hypervisor;
requesting the guest, by the hypervisor, to provide one or more fast access addresses;
receiving from the guest, by the hypervisor, the one or more fast access addresses; and
storing, by the hypervisor, the one or more fast access addresses in the fast access address list.

9. The method of claim 8, further comprising receiving, by the hypervisor from the guest, one or more indicators of types of instructions associated with the one or more fast access addresses.

10. The method of claim 9, wherein the one or more indicators are hard-coded in device drivers of the guest.

11. The method of claim 8, wherein the one or more fast access addresses are hard-coded in device drivers of the guest.

12. The method of claim 1, further comprising, during hypervisor initialization:
notifying the guest, by the hypervisor, of a presence of the hypervisor; and
providing the guest, by the hypervisor, with one or more fast access addresses, wherein the guest is to store the one or more fast access addresses in the fast access address list in guest memory.

13. A system comprising:
a memory;
a host processing device, operatively coupled to the memory; and
a hypervisor executed by the host processing device, having access to the memory and use of the host processing device, the host processing device to execute the hypervisor to:
receive an indication of an exit by a guest to the hypervisor;
determine, in view of the received indication, that the exit is associated with a memory-mapped input-output (MMIO) instruction;
reference a fast access address list to determine that an address that caused the exit is a fast access address stored in the fast access address list, wherein the fast access address list is separate from a guest page table associated with the guest;
identify a first register corresponding to the fast access address in the fast access address list, the first register storing a type of the MMIO instruction;
identify, via the first register, a second register storing information associated with the MMIO instruction;
identify the MMIO instruction in view of the stored type of the MMIO instruction and the information associated with the MMIO instruction; and
execute the MMIO instruction on behalf of the guest.

14. The system of claim 13, wherein the fast access address list is stored in guest memory.

15. The system of claim 13, wherein the first register and the second register are one or more general purpose registers.

16. A non-transitory computer-readable storage medium comprising instructions that, when accessed by a processing device, cause the processing device to:
receive, by the processing device of a host executing a hypervisor, an indication of an exit by a guest to the hypervisor;
determine, by the hypervisor, in view of the indication, that the exit is associated with a memory-mapped input-output (MMIO) instruction;
reference, by the hypervisor, a fast access address list to determine that an address that caused the exit is a fast access address stored in the fast access address list, wherein the fast access address list is separate from a guest page table associated with the guest;
identify, by the hypervisor, a first register corresponding to the fast access address in the fast access address list, the first register storing a type of the MMIO instruction;
identify, via the first register, a second register storing information associated with the MMIO instruction;
identify, by the hypervisor, the MMIO instruction in view of the stored type of the MMIO instruction and the information associated with the MMIO instruction; and
execute, by the hypervisor, the MMIO instruction on behalf of the guest.

17. The non-transitory computer-readable storage medium of claim 16, wherein the fast access address list is stored in hypervisor memory.

18. The non-transitory computer-readable storage medium of claim 16, wherein the fast access address list is stored in guest memory.

19. The non-transitory computer-readable storage medium of claim 16, wherein the first register and the second register are one or more general purpose registers.

20. The system of claim 13, wherein the fast access address list is stored in hypervisor memory.

* * * * *